Figure 1:
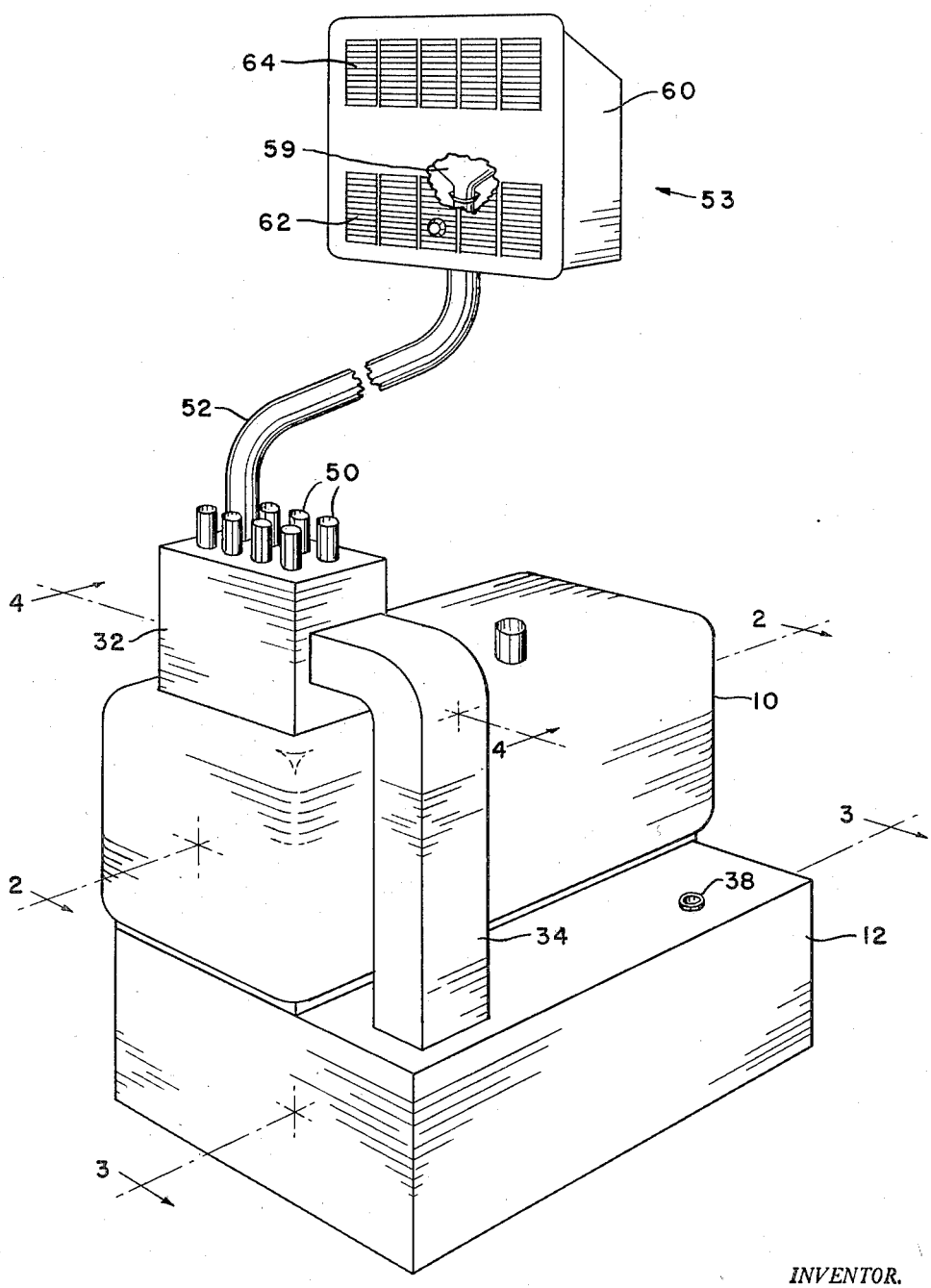

INVENTOR.
CALVIN D. MacCRACKEN
BY James M. Relph
ATTORNEY

INVENTOR.
CALVIN D. MACCRACKEN
BY James M. Relph
ATTORNEY

United States Patent Office 2,770,445
Patented Nov. 13, 1956

2,770,445
AIR CONDITIONING APPARATUS

Calvin D. MacCracken, Tenafly, N. J., assignor to Jet-Heet, Inc., Englewood, N. J., a corporation of New York Application June 22, 1953, Serial No. 363,210

1 Claim. (Cl. 257—9)

This invention relates to improvements in air conditioning apparatus, and particularly to apparatus of the type comprising combined heating and cooling means for supplying heated or cooled air to enclosures such as the rooms of a house.

Despite the many and varied proposals that have been made for combined heating and cooling systems, such systems have not gone into widespread use, due in part to lack of sufficient heating and cooling capacity in the simpler systems, or prohibitive cost of complex systems of adequate capacity, or both. In the great majority of cases, both in new house construction and in the replacement of the "air conditioning" system in existing dwellings, it is still standard practice to install a heating system only, relying on the use of fans, individual room coolers and the like to supply cool air during the summer months. It is among the objects of the present invention to provide a combined heating and cooling air conditioning system of capacity adequate to maintain comfortable temperatures in the average dwelling throughout the entire year, and at a cost low enough to compare favorably with that of many systems designed solely for heating purposes.

In the conventional warm air heating system it is common practice to distribute heated air through relatively large ducts at temperatures of the order of 160° F., with substantially all of the room air being recirculated continuously to the conditioning apparatus through return ducts and through natural areaways in the building. When it is attempted to combine an air cooler with such a heating system, several problems are encountered, particularly in connection with distribution of the warm and cold air through the same ducts.

First, the ducts are relatively expensive to install, even in new building construction. In existing dwellings, when a heating and cooling air conditioning system might be desirable as replacement for a steam or hot water heating system, it is even more costly and, in fact, almost impossible to install such ducts without major alterations.

Another problem in such a system comes from the fact that warm air can be supplied to a room at a temperature considerably above the desired ambient without discomfort to the occupants, while the temperature of cooling air must be kept relatively much closer to the desired ambient to avoid occupant discomfort. Therefore, in climates where the heating and cooling loads are roughly the same, relatively greater volumes of cooling air must be delivered in order to control room temperature. This not only requires a large, costly blower, but also means that the distribution ducts either must be larger than would be required for the warm air or that the cool air must be moved at a higher velocity than the warm air. For example, it can be shown in a typical case that to move the required volume of cool air through a duct that is just adequate to handle the necessary volume of warm air, a velocity increase of about 70% is required. With the usual large area ducts, this almost invariably makes for objectionably noisy cool air distribution, as well as requiring a very large capacity blower.

The differences in the effect of gravity on the relatively light warm air and the relatively more dense cool air also complicate the distribution problem. In order for the warm air to disseminate properly, it is customary to have the duct outlets or "registers" at the floor level. This, however, is very unsatisfactory for cooling, as in this case the outlets ideally should be at ceiling level—a very unsatisfactory location for warm air outlets. Thus, cool air coming from a floor register and moving to a return duct (usually on the opposite side of the room) creates an unpleasant cold draft across the floor without properly cooling the room. Conversely, warm air coming from a high wall register and moving to a return duct across the room will overheat the upper parts of the room while leaving the floor area cold.

A related problem arises in the air conditioning of two or more story dwellings. To compensate for the differing gravity effect with warm and cool air, the various distributing ducts should be "balanced" by adjustment of duct dampers or the like each time the system is switched from warm to cool air operation, or vice versa, to avoid overheating upper floor rooms in the winter and undercooling the same rooms in the summer.

In short, although there are in use combination heating and cooling systems having a common distribution duct system, such installations have a number of objectionable features that it is among the objects of the present invention to overcome.

In accordance with a preferred embodiment of the invention, the foregoing and other related objects and advantages are attained in a system wherein air at relatively high or low temperature is supplied at high velocity through small diameter, air-and-vapor-tight, insulated ducts to diffusers located in the enclosures or rooms being heated or cooled. At the diffusers, the high or low temperature air is mixed with a quantity of room air by aspirating action and discharged into the room to give the desired heating or cooling effect. At the air conditioning apparatus, a simple valving arrangement is provided for selectively closing off the discharge path from the unit that is not being used at any given time to prevent by-passing heated or cooled air through the unit not being used. In accordance with a further feature of the invention, novel means are provided at the aspirating diffusers for the dissipation of condensate that may collect when cool air is being supplied.

Figure 2:
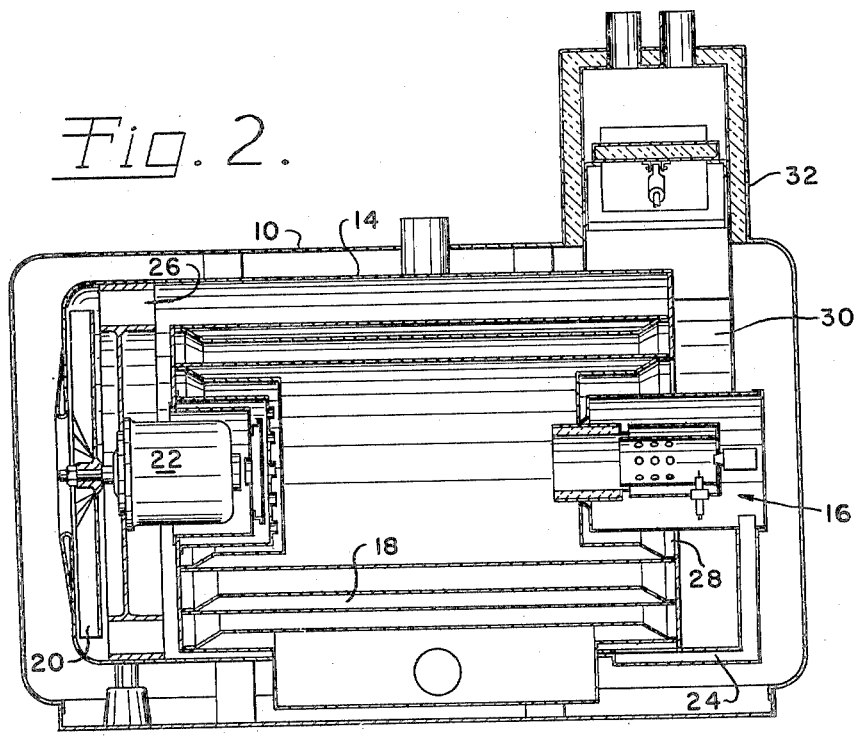
Figure 3:
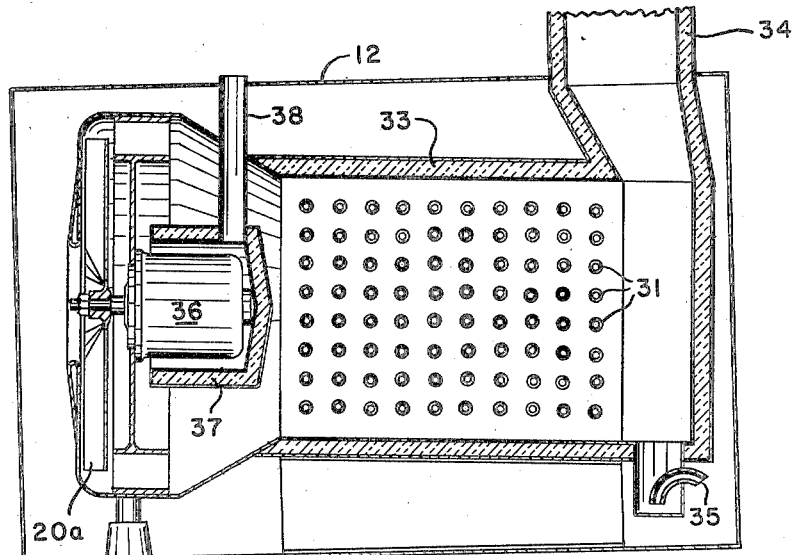
Figure 5:
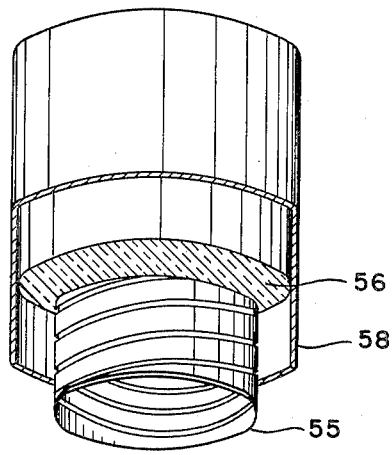
Figure 6:
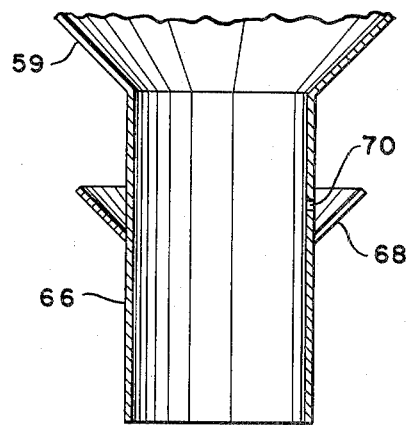
Figure 4:
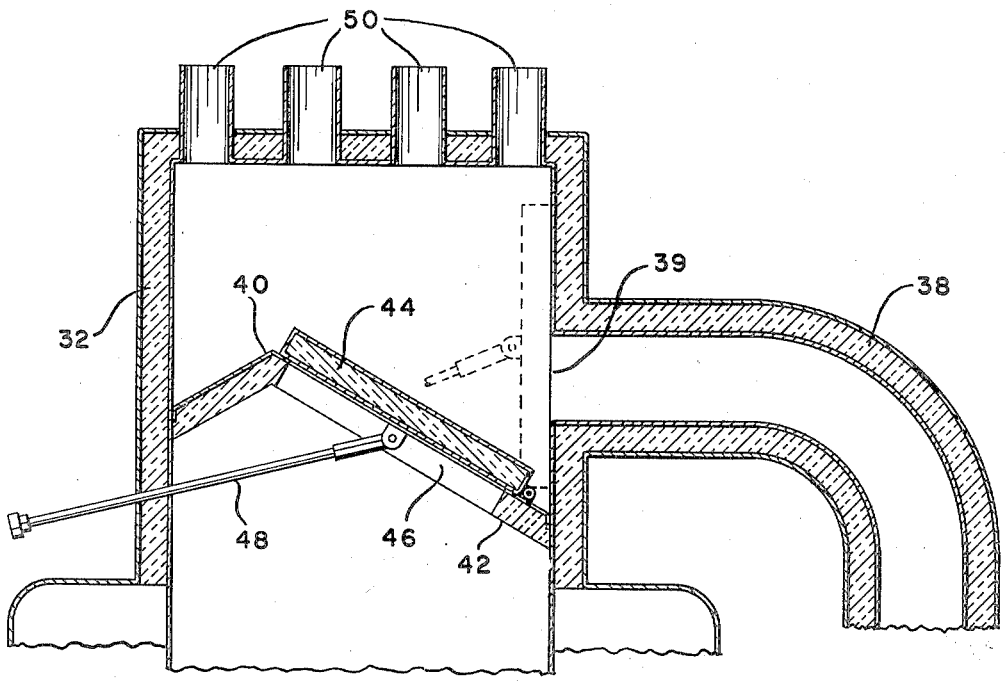

A more complete understanding of the invention, and of further objects and features thereof, can be had from the following description of an illustrative embodiment, when considered in connection with the accompanying drawing, wherein Figure 1 is a perspective view of a complete apparatus embodying the invention, including the distributing duct from the heating and cooling means to a diffuser, Figure 2 is a side view, partly in section, of an air heater such as may be used in the apparatus of Figure 1, taken in the direction of the arrows 2—2 in Figure 1, Figure 3 is a view similar to Figure 2 of the air cooler in the apparatus of Figure 1, taken in the direction of the arrows 3—3 in Figure 1, Figure 4 is a sectional view of the chamber through which the heated and cooled air is delivered to the distributing ducts, taken in the direction of the arrows 4—4 in Figure 1, Figure 5 is an enlarged view of a section of distributing duct, and Figure 6 is an enlarged sectional view of the neck portion of the diffuser, showing the condensate evaporator.

Referring to the drawing, an air conditioning system embodying the invention may comprise upper and lower housing sections 10, 12, enclosing, respectively, heating and cooling apparatus as described hereinafter. In their entirety, the housings 10, 12 may occupy a space no greater than 2½ x 3 x 4 ft.

The heating apparatus enclosed in the upper housing section 10 comprises a high pressure, forced air unit adapted to deliver heated air at a temperature of the order of 350° F. As used herein and in the appended claims, the term "high pressure forced air unit" is intended to mean a unit adapted to supply heated (or cooled) air at the unit outlet (e. g., at a furnace "bonnet" or plenum chamber at a pressure of 1 inch of water, as compared to low pressure units conventionally operating at a maximum outlet pressure of 0.2 inch of water. Preferably, the heater in the apparatus of Figure 1 is of the type shown in U. S. Patent 2,488,548, or as shown in pending application Serial No. 288,187, filed May 16, 1952, and assigned to the assignee of the present invention.

A heater unit of the latter type is illustrated in Figure 2 of the drawing, and comprises within the housing 10 a substantially cylindrical shell 14, enclosing at one end a high velocity fluid fuel burner 16 for supplying hot gaseous combustion products to a heat exchanger 18, and at the other end enclosing a blower 20 and motor 22 for supplying air both to the burner 16 and to the heat exchanger 18.

The burner receives combustion air through a duct 24, while the heat exchanger, which is a hollow spiral element, receives air directly from the blower 20 through an end opening 26, passes this air around its several turns and thence out through an opposite end opening 28 and through an end space 30 to an insulated chamber 32 located on top of the heater housing 10.

In the bottom housing section 12, as illustrated in Figure 3, there is housed a high pressure air cooling unit adapted to deliver air at a temperature of the order of 35° F. The air cooler generally is of conventional construction, comprising a compressor and condenser assembly (not shown) for circulating liquefied refrigerant through evaporator coils 31. A blower 20a is arranged to supply air under pressure through an insulated conduit 33 in which the coils 31 are located, to deliver cooled air at high pressure to an insulated duct 34 that leads upwardly and terminates at a side opening 39 in the insulated chamber 32 (Figure 4). A condensate drain 35 is provided at the lower end of the duct 34. The blower motor 36 is surrounded by an insulated housing 37, with a vent line 38 being provided to carry motor heat from the housing 37 to outside the casing 12.

The blowers 20, 20a in the heating and cooling units preferably are of the type described in U. S. Patent 2,462,518, differing from each other only in their air delivery capacities. It will be understood that the blower 20a in the cooling unit will be required to have the greater air delivery capacity because of the greater density of the cold air delivered by the cooling unit.

Inside the chamber 32, as shown in Figure 4, an insulated partition 40 extends across the chamber just above the bottom opening which communicates with the heating unit. The partition 40 has a portion 42 that slants upwardly and away from the side opening 39 so as to face partially toward the side opening 39. An insulated closure plate 44 is hinged to the upper side of the slanted partition section 42, to be movable from a first position (shown in full lines) covering an opening 46 in the partition 40 to a second position (shown in dotted lines) covering the chamber side opening 39. In each position, the closure plate 44 will seal off the covered opening tightly to substantially prevent air leakage therethrough.

An actuating rod 48 pivoted to the underside of the closure plate 44 extends through the side wall of the chamber 32 for convenient access in moving the closure plate 44 between the positions shown.

On top of the chamber 32, a plurality of outlet nipples 50 are provided for coupling to distribution ducts 52 (Figure 1) leading to diffusers 53 located in the rooms or spaces to be air conditioned.

The distribution ducts 52 not only must be well insulated to maintain properly the relatively high and low temperatures of the air circulated therethrough, but also must be air tight and moisture proof to absolutely preclude leakage of the high temperature air and to prevent moisture from accumulating inside the insulation when cold air is passing through the ducts. To this end, as shown in Figure 5, the ducts 52 preferably comprise flexible elements having a core formed of spirally wound metallic strip 55, a covering 56 of insulating material, preferably fibered glass wool of high density, and an outer covering or boot 58 of a woven fibered glass fabric made air tight and moisture proof by a coating of a thermoplastic material, such as organosol, or a thermosetting rubber such as neoprene, butyl or polybutadiene.

In view of the relatively high and low temperatures of the air supplied by the heating and cooling units, it is necessary to dilute this air with a quantity of air drawn from the room to be heated or cooled so that the resulting air mixture will be at a moderate temperature suitable for heating or cooling the room without discomfort to the occupants. To this end, the diffusers 53 (Figure 1) to which the distribution ducts 52 are connected are arranged to have an aspirating action, and preferably take the general form of the diffusers described in U. S. Patent 2,613,587, comprising a nozzle 59 having a relatively narrow sinuous or zigzag orifice (not shown), located in a casing 60 having a bottom inlet opening 62 through which room air can enter the casing and a top outlet opening 64 through which a mixture of room air and air delivered to the nozzle can be discharged into the room.

Since the air supplied by the cold air system will be at a relatively low temperature, say 35 to 40° F., it is entirely possible for moisture to condense on the nozzle during warm weather when the cold air system is in operation. Such moisture, of course, should not be allowed to accumulate in the bottom of the casing 60 to cause deterioration. On the other hand, a drain system or the like not only will be inconvenient to install for each of the several diffusers, but also would add materially to the expense of the installation. To obviate this difficulty, in accordance with the present invention the neck portion 66 of the nozzle 59 is surrounded by a shallow tray 68 (see Figure 6) adapted to collect moisture accumulating on the nozzle and running down the sides thereof. Just above the bottom of the tray 68, one or more perforations 70 in the nozzle wall provide air escape passages to allow a portion of the air delivered to the nozzle to pass out over the tray and evaporate any water that has collected in the tray.

When the system as described in the foregoing is in operation, the closure plate 44 will be set to the proper position for hot or cold air delivery, and the corresponding unit 10 or 12 put in operation. Of course, the unit in use ordinarily will be controlled automatically to maintain desired room temperatures by means of the usual thermostatic controls (not shown), once the unit is turned on.

By utilizing small diameter insulated distribution ducts, in combination with high pressure warm and cold air supply units, several advantages are realized. For one thing, it is entirely feasible to distribute both the warm and the cold air through the same ducts without appreciable duct noise and at a velocity differential of only about 30% rather than at the 70% differential previously referred to. Also, much smaller quantities of air need to be moved than in conventional large duct systems, to obtain the desired heating and cooling effect, because of the relatively high and low temperatures of the distributed air. Again, once the ducts have been balanced for proper air distribution to the various rooms, even in a two or more story building, it is unnecessary thereafter to rebalance when switching from warm to cool air operation, as the delivery of air at high pressure and velocity through the small diameter ducts is not appreciably affected by gravity. A further very important advantage is the ease and economy of installation of the small diameter ducts, either in new house construction or in existing buildings, as compared with the expense and frequent impossibility of installing large area ducts in existing structures.

Another outstanding feature of the system of the present invention is that no more than about 25–35% of the room air need be recirculated through the conditioning apparatus. This percentage of recirculation is easily handled by natural areaways in the building without the use of any return ducts. Also, due to the comparatively low temperature, say 35° F., to which the air is cooled when cooling is required, unusually good dehumidifying action is obtained. Furthermore, the aspirational mixing of the hot or cold air with the room air gives extremely uniform, comfortable air conditioning of the rooms, whether heating or cooling. This is in part because room air "leaves" the room, to be mixed with the incoming hot or cold air, at the same point (the diffuser) at which the warm or cool mixture enters the room. This substantially eliminates cold drafts, such as may be caused with conventional apparatus in which large quantities of conditioning air enter and leave on opposite sides of the room, and results in exceptionally uniform and efficient warming or cooling of the entire room without the conflict of register location encountered in prior art systems.

I claim:

In a diffuser for a forced air domestic heating and cooling system of the type comprising separate hot and cold air delivery units and distributing means for conducting either warm or cold air from said units to a plurality of diffusers, in combination, a casing having air inlet and outlet openings, a nozzle in said casing having a neck portion, a collar forming a channel around said neck portion of said nozzle within which to collect condensate forming on said nozzle, and said nozzle neck having a hole therein adjacent said collar and opening into said channel for diverting into said channel a small portion of the air delivered to said nozzle whereby to evaporate condensate collecting in said channel.

References Cited in the file of this patent

UNITED STATES PATENTS

| | | |
|---|---|---|
| 186,051 | Mihan | Jan. 9, 1877 |
| 843,909 | Peters et al. | Feb. 12, 1907 |
| 1,296,968 | Klein | Mar. 11, 1919 |
| 1,749,417 | Davis et al. | Mar. 4, 1930 |
| 2,294,038 | Kucher | Aug. 25, 1942 |
| 2,327,664 | Otis | Aug. 24, 1943 |
| 2,495,861 | Newton | Jan. 31, 1950 |
| 2,551,751 | MacDougall | May 8, 1951 |
| 2,609,743 | Ashley et al. | Sept. 9, 1952 |
| 2,613,587 | MacCracken | Oct. 14, 1952 |

OTHER REFERENCES

The Saturday Evening Post, Oct. 21, 1950, pages 100 and 101.